United States Patent
Langstrom et al.

(10) Patent No.: US 8,492,671 B2
(45) Date of Patent: Jul. 23, 2013

(54) PRODUCTION OF [$^{18}$F]-F2 FROM [$^{18}$F]-FLUORIDE USING A PLASMA INDUCED SCRAMBLING PROCEDURE

(75) Inventors: Bengt Langstrom, Uppsala (SE); Johan Ulin, Uppsala (SE)

(73) Assignee: GE Healthcare Limited, Buckinghamshire (GB)

( * ) Notice: Subject to any disclaimer, the term of this patent is extended or adjusted under 35 U.S.C. 154(b) by 1273 days.

(21) Appl. No.: 12/298,784

(22) PCT Filed: Apr. 24, 2007

(86) PCT No.: PCT/IB2007/001076
§ 371 (c)(1),
(2), (4) Date: Oct. 28, 2008

(87) PCT Pub. No.: WO2007/129165
PCT Pub. Date: Nov. 15, 2007

(65) Prior Publication Data
US 2009/0104087 A1 Apr. 23, 2009

Related U.S. Application Data

(60) Provisional application No. 60/795,784, filed on Apr. 28, 2006.

(51) Int. Cl.
*C01B 7/20* (2006.01)
*G21G 4/08* (2006.01)
*G21H 5/02* (2006.01)

(52) U.S. Cl.
USPC ............ 204/157.21; 204/157.43; 204/157.48

(58) Field of Classification Search
USPC ............... 204/157.48, 157.21, 157.2, 157.43
See application file for complete search history.

(56) References Cited

U.S. PATENT DOCUMENTS

| | | | |
|---|---|---|---|
| 4,059,761 A * | 11/1977 | Dawson | 250/287 |
| 5,770,030 A | 6/1998 | Hamacher et al. | |
| 6,031,228 A * | 2/2000 | Abramson | 422/70 |
| 2003/0121796 A1 | 7/2003 | Siegele et al. | |
| 2004/0109817 A1 | 6/2004 | Smith et al. | |

FOREIGN PATENT DOCUMENTS

| EP | 1411540 | 4/2004 |
|---|---|---|
| WO | 2006/010857 | 2/2006 |

OTHER PUBLICATIONS

Grossman et al, "Plasma Isotope Separation Methods," IEEE Transactions on Plasma Science, vol. 19, No. 6, Dec. 1991.*
Stueber, G.J., et.al. "Production of fluorine-containing molecular species in plasma-generated atomic F flows" Journal of Physical Chemistry. A, Mlecules, Spectroscopy, Kinetics, Environmnet and General Therory, Washing, DC, vol. 107, Jan. 2003, pp. 7775-7782.
Pinto, G, et.al. "Target systems for radioisotope production" Transactions on Nuclear Science, vol. Ns-30, No. 2, 1983 pp. 1797-1800.
Bergman, et.al. "Fluorine-18-labeled fluorine gas for synthesis of tracer molecules" Nuclear Medicine & Biology, vol. 24, 1997, pp. 677-683.
PCT/IB2007/001076 Int'l Search Report/Written Opinion dated Jun. 2008.

* cited by examiner

*Primary Examiner* — Keith Hendricks
*Assistant Examiner* — Colleen M Raphael
(74) *Attorney, Agent, or Firm* — Yonggang Ji

(57) ABSTRACT

A method of producing [$^{18}$F]F$_2$ from [$^{18}$F] fluoride through a plasma induced scrambling procedure is provided. The present invention also provides an apparatus for preparing [$^{18}$F]F$_2$ from [$^{18}$F] fluoride in a plasma induced scrambling procedure. Kit claims for preparing [$^{18}$F]F$_2$ from [$^{18}$F] fluoride in a plasma induced scrambling procedure as well as method of use and use of claims for preparing [$^{18}$F]F$_2$ from [$^{18}$F] fluoride through a plasma induced scrambling procedure are also provided.

8 Claims, 3 Drawing Sheets

Diagram of a plasma induction by microwaves

PRODUCTION OF [$^{18}$F]-F2 FROM [$^{18}$F]-FLUORIDE USING A PLASMA INDUCED SCRAMBLING PROCEDURE

This application is a filing under 35 U.S.C. 371 of international application number PCT/IB2007/001076, filed Apr. 24, 2007, which claims priority to application No. 60/795,784 filed Apr. 28, 2006, in the United States the entire disclosure of which is hereby incorporated by reference.

FIELD OF THE INVENTION

The present invention relates to a method of preparing [$^{18}$F]F$_2$ from [$^{18}$F] fluoride by a plasma induced scrambling procedure. The present invention also relates to an apparatus of preparing [$^{18}$F]F$_2$ by a plasma induced scrambling process. The present invention further relates to kits for producing a method and apparatus of [$^{18}$F]F$_2$ by a plasma induced scrambling reaction. Additionally, a method of use and use of claims for preparing [$^{18}$F]F$_2$ from [$^{18}$F] fluoride through a plasma induced scrambling procedure are also provided.

BACKGROUND OF THE INVENTION

Electrophilic fluorination of organic molecules with F$_2$, or its derivatives is efficient, controllable and fast. F$_2$ is a highly potent chemical agent. It is the most reactive pure element. (Bergman et al., *Nucl. Med. Biol.,* 1997, vol. 24, pgs. 677-683). The fluorine atom is about the same size as the hydrogen atom. This makes it possible for fluorine to mimic hydrogen with respect to steric requirements in molecules as well as at binding sites on receptors and enzymes. Fluorine substitution can also have a profound effect on the lipofilicity and biological activity of small molecules. (Park et al., *Drug Metab. Rev.,* 1994, vol. 26, pgs. 605-643). The Positron Emission Tomography technique makes it possible to follow, in a patient, the binding of radiolabeled ligands to receptor sites, thus making it possible to quantitate the number of binding sites in both healthy and diseased states. Displacement of the labeled ligands makes it possible to measure the affinity to the binding site. Tracer studies with potent and/or toxic neuroreceptor ligands require high specific radioactivity for the tracer, as the amount of mass that can be injected into a human subject is limited by the toxicity of the substance and its affinity for the receptor site. For an injected dose of typically 185 MBq, the amount will be 10 nmol when the specific radioactivity ("SA") is 185 GBq/micromol. (Bergman et al.).

Electrophilic radiofluorine is particularly suitable for the synthesis of fluoroaryl compounds ([$^{18}$F]Ar—F) by cleavage of aryl-metal bonds of typically Ar-MR (M=Sn, Hg, Si, R=(CH$_3$)n) compounds either with [$^{18}$F]F$_2$ or [$^{18}$F]CH$_3$COOF. The factor limiting the more widespread use of the method has been the low specific radioactivity of the labeled fluorine gas available through radionuclide production from gas phase target materials, typically neon or $^{18}$O$_2$ mixed with carrier F$_2$. Gas targetry for the production of [$^{18}$F]F$_2$ has recently been extensively reported. Straatman et al. describe a method where n.c.a. [$^{18}$F]HF, in an exchange reaction with F$_2$, is converted to [$^{18}$F]F$_2$ by a microwave discharge. (Straatman et al., *Label. Compd. Radiopharm.,* 1982, vol. 19, pg. 1373).

A simplistic way of producing $^{18}$F is to irradiate, with a particle accelerator beam, highly 18O-enriched water. Through the $^{18}$O(p,n) $^{18}$F nuclear reaction, up to several curies of radioactivity can be produced. The radiolabeled fluoride ([$^{18}$F]F-aq) recovered after charged particle irradiation can be used for the production of numerous labeled neurotracers. (Bergman et al.) The synthetic chemistry, however, with this anion is usually neither simple nor fast, especially if more complex molecules are needed.

Furthermore, Bergman et al. developed a method for the routine use of [$^{18}$F] F$_2$ for synthesis of radiotracers for PET. The SA of the product should be such that studies with receptor ligands are possible. The SA of [$^{18}$F]F$_2$ achieved by Bergman et al. was about 90 GBq/micromole. Bergman et al. considered four different methods of excitation: a) excitation with a cyclotron particle beam; b) excitation with a hard UV-light; c) excitation via an electric discharge through a gas; and d) excitation with laser light. Methods b and c were considered to be practical, and were therefore tested by Bergman et al.

In view of the prior art, a more rapid method to mass produce [$^{18}$F]F$_2$ by obtaining a higher SA than previously reported is needed.

Discussion or citation of a reference herein shall not be construed as an admission that such reference is prior art to the present invention.

SUMMARY OF THE INVENTION

In view of the needs of the prior art, the present invention provides a method of obtaining [$^{18}$F]F$_2$ from [$^{18}$F] fluoride, for use in electrophilic fluorination reactions.

Unlike previous methods, [$^{18}$F]F$_2$ is obtained from [$^{18}$F] fluoride by using a plasma induced scrambling procedure. This procedure uses [$^{18}$F] fluoride, which has been isolated from a water target electrolytically, and then converting the [$^{18}$F] fluoride directly from an electrode to [$^{18}$F]F$_2$ by adding a carrier gas source such as fluorine to form plasma or a mixture thereof where either F$_2$ is added to the carrier gas source in controlled amounts, or as a metal fluoride, and then inducing the plasma by any of the following ways: a) a fluorescent light tube driver circuit, where components are commercially available and inexpensive; b) a plasma induction by microwaves; or c) a high voltage discharge may also be used. Thereafter the contents within the reactor are emptied into a stream of halogen or noble gas wherein [$^{18}$F]F$_2$ is trapped.

The present invention also depicts an apparatus for preparing [$^{18}$F]F$_2$ in a plasma reactor system. The apparatus comprises of a [$^{18}$F]F$_2$ produced from [$^8$F] fluoride wherein said system further comprises a carrier gas or a metal fluoride, a controlled amount of fluorine gas, at least a fluorescent light tube driver circuit, a plasma induction by microwaves, or a high voltage discharge, and a stream of gas wherein [$^{18}$F]F$_2$ is trapped.

Yet another embodiment comprises a kit for preparing [$^{18}$F]F$_2$ from [$^{18}$F] fluoride is presented. The kit comprises the steps of: isolating [$^{18}$F] fluoride from a water target by electrolysis in a reactor; then drying the [$^{18}$F] fluoride and thereafter filling the reactor with a carrier gas to form plasma or a mixture thereof wherein the reactor also contains a controlled amount of fluorine gas; next igniting the plasma by using at least a fluorescent light tube driver circuit, a plasma induction by microwaves, or a high voltage discharge; and thereafter emptying the contents in the reactor into a stream of gas wherein [$^{18}$F]F$_2$ is trapped.

BRIEF DESCRIPTION OF FIGURES

The invention will be described by preferred embodiments to be contemplated with reference to the accompanying drawings wherein like reference numerals are used throughout to designate like parts. In the drawings.

DETAILED DESCRIPTION OF THE INVENTION

The ability to produce the plasma required to prepare $[^{18}F]F_2$ from $[^{18}F]$ fluoride is achieved either by using a high voltage charge wherein a voltage is about 5 kV to about 20 kV, a fluorescent light tube driver circuit or by microwave induced plasma.

Figure 1:
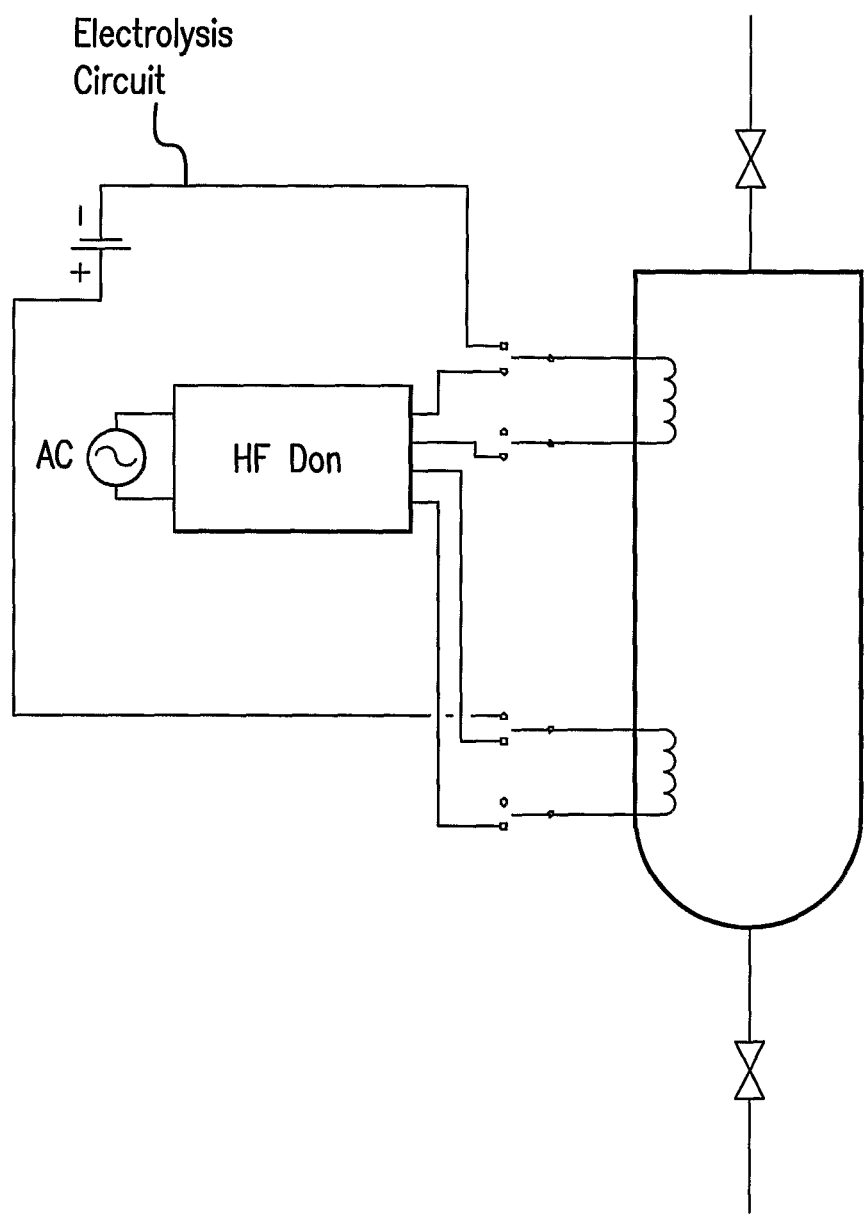
FIG. 1 shows an embodiment of a modern type of fluorescent light tube driver circuit used in the present invention.
Figure 2:
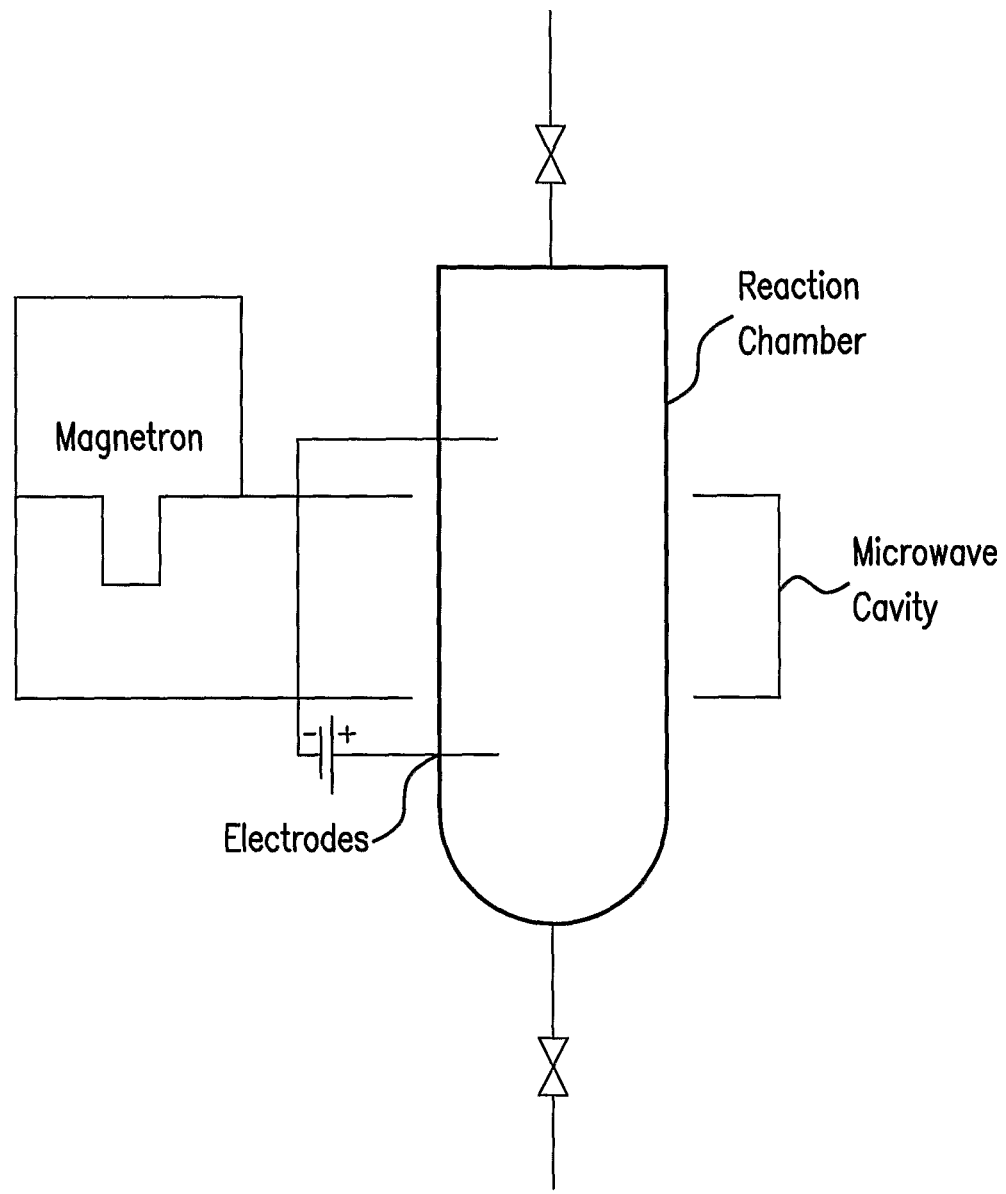
FIG. 2 depicts an embodiment of plasma induced by microwaves used in the present invention.
Figure 3:
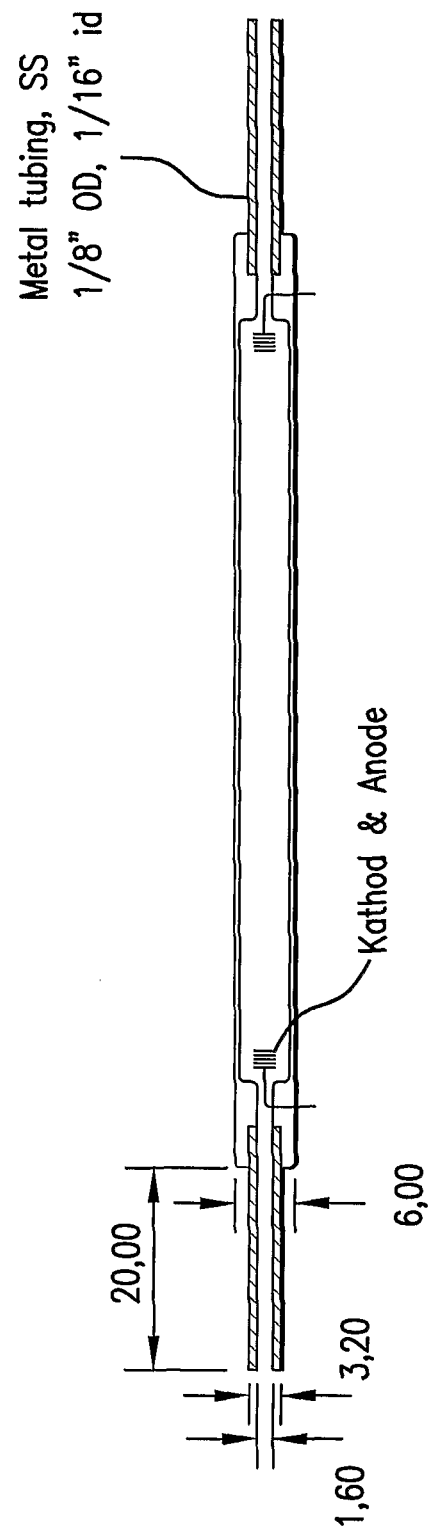
FIG. 3 presents the plasma reaction chamber used in the present invention.

More specifically, in the present invention, $[^{18}F]$ fluoride is isolated from a water target by electrolysis in a reactor. The $[^{18}F]$ fluoride is then dried. Next, the reactor is filled with a carrier gas such as a noble gas or halogen gas to form a plasma or a mixture thereof wherein the reactor also contains a controlled amount of carrier gas such as fluorine gas. A metal fluoride such as Na, K, Mg, Ca or a salt thereof could replace the carrier gas in order to increase the specific radioactivity ("SA") from about 5 to about 15%. The metal fluoride would be added as either a deposition on the wall of the reactor, or as a powder within the reactor. The plasma is then lit using a modern type of fluorescent light tube driver circuit (FIG. 1), or by plasma induced by microwaves (FIG. 2), or by high voltage discharge. Thereafter this scrambling reaction is completed. The contents within the reactor are then emptied into a stream of gas and the formed $[^{18}F]F_2$ can be trapped and used for further radiolabeling synthesis. The radiopharmaceutical yield at this point is about 90 to about 98% and can be reached within 5 minutes.

The current invention sets forth several advantages of producing $[^{18}F]F_2$ in a plasma induced scrambling method. The current method presents an ease of use over the other prior methods and a quicker synthesis time for the production of $[^{18}F]F_2$. Short synthesis times with the use of a metal fluoride to form plasma in the reactor will also yield compounds with higher radiochemical yield and SA due to less decay. Radiochemical purity (RCP) is defined as the amount of radioactivity originating from a specific substance in relation to the total amount of radioactivity in a sample, expressed in %. Additionally, SA is the ratio between the amount of radioactivity originating from a specific substance labeled with a radionuclide and the total amount of that specific substance.

Below a detailed description is given of a method for producing $[^{18}F]F_2$ from $[^{18}F]$ fluoride through a plasma induced scrambling procedure.

The present invention relates to a method for preparing $[^{18}F]F_2$ from $[^{18}F]$ fluoride, comprising the steps of isolating $[^{18}F]$ fluoride from a water target by electrolysis in a reactor; then drying the $[^{18}F]$ fluoride and thereafter filling the reactor with a carrier gas or a metal fluoride to form plasma or a mixture thereof wherein the reactor also contains a controlled amount of fluorine gas; next igniting the plasma by using at least a fluorescent light tube driver circuit, a plasma induction by microwaves, or a high voltage discharge; and thereafter emptying the contents in the reactor into a stream of gas wherein $[^{18}F]F_2$ is trapped.

Another embodiment of the present invention is that the metal fluoride is a deposition on the wall of the reactor or a powder on the wall of the reactor.

Yet another embodiment is that the reactor comprises a reaction chamber and an optional microwave cavity.

A further embodiment is wherein the carrier gas is a noble gas or a halogen gas.

An additional embodiment is when the metal within the metal fluoride is Na, Ca, K, Mg, Mn or a salt thereof.

Yet another embodiment of the present invention is when the controlled amount of fluorine gas is about 200 nanomoles to about 10 micromoles.

An additional embodiment is when the high voltage discharge has a voltage of about 10 kV to about 50 kV.

Another embodiment is when the stream of gas is a halogen gas or a noble gas.

Yet another embodiment of the present invention is that the reactor generates no heat.

In another embodiment of the present invention of an apparatus for preparing $[^{18}F]F_2$ in a plasma reactor system is presented. The apparatus comprises of a $[^{18}F]F_2$ produced from $[^{18}F]$ fluoride wherein said system further comprises a carrier gas or a metal fluoride, a controlled amount of fluorine gas, at least a fluorescent light tube driver circuit, a plasma induction by microwaves, or a high voltage discharge, and a stream of gas wherein $[^{18}F]F_2$ is trapped.

Another embodiment of the present invention is that the metal fluoride is a deposition on the wall of the reactor or a powder on the wall of the reactor.

Yet another embodiment is that the reactor of the apparatus comprises a reaction chamber and an optional microwave cavity.

A further embodiment is wherein the carrier gas is a noble gas or a halogen gas.

An additional embodiment is when the metal of the apparatus within the metal fluoride is Na, Ca, K, Mg, Mn or a salt thereof.

Yet another embodiment of the present invention is when the controlled amount of fluorine gas of the apparatus is about 200 nanomoles to about 10 micromoles.

An additional embodiment of the apparatus is when the high voltage discharge has a voltage of about 10 kV to about 50 kV.

Another embodiment of the apparatus is when the stream of gas is a halogen gas or a noble gas.

Yet another embodiment of the present invention is that the reactor of the apparatus generates no heat.

In a further embodiment of the present invention a kit for preparing $[^{18}F]F_2$ from $[^{18}F]$ fluoride is disclosed. The kit comprises the steps of:

isolating $[^{18}F]$ fluoride from a water target by electrolysis in a reactor; then drying the $[^{18}F]$ fluoride and thereafter filling the reactor with a carrier gas or a metal fluoride to form plasma or a mixture thereof wherein the reactor also contains a controlled amount of fluorine gas; next igniting the plasma by using at least a fluorescent light tube driver circuit, a plasma induction by microwaves, or a high voltage discharge; and thereafter emptying the contents in the reactor into a stream of gas wherein $[^{18}F]F_2$ is trapped.

Another embodiment of the present invention is that the metal fluoride of the kit is a deposition on the wall of the reactor or a powder on the wall of the reactor.

Yet another embodiment of the kit is that the reactor comprises a reaction chamber and an optional microwave cavity.

A further embodiment of the kit is wherein the carrier gas is a noble gas or a halogen gas.

An additional embodiment of the kit is when the metal within the metal fluoride is Na, Ca, K, Mg, Mn or a salt thereof.

Yet another embodiment of the present invention kit is when the controlled amount of fluorine gas is about 200 nanomoles to about 10 micromoles.

An additional embodiment of the kit is when the high voltage discharge has a voltage of about 10 kV to about 50 kV.

Another embodiment of the kit is when the stream of gas is a halogen gas or a noble gas.

Yet another embodiment of the present invention is that the reactor of the kit generates no heat.

A further embodiment of the present invention depicts a method of use for preparing $[^{18}F]F_2$ from $[^{18}F]$ fluoride, comprising the steps of:

isolating $[^{18}F]$ fluoride from a water target by electrolysis in a reactor; then drying the $[^{18}F]$ fluoride and thereafter filling the reactor with a carrier gas or a metal fluoride to form plasma or a mixture thereof wherein the reactor also contains a controlled amount of fluorine gas; next igniting the plasma by using at least a fluorescent light tube driver circuit, a plasma induction by microwaves, or a high voltage discharge; and thereafter emptying the contents in the reactor into a stream of gas wherein $[^{18}F]F_2$ is trapped.

Still a further embodiment of the present invention depicts a method of use for preparing $[^{18}F]F_2$ from $[^{18}F]$ fluoride, wherein the metal fluoride is a deposition on the wall of the reactor or a powder on the wall of the reactor.

A further embodiment of the present invention shows a method of use wherein the reactor comprises a reaction chamber and an optional microwave cavity.

Yet another embodiment of the present invention shows a method of use wherein the carrier gas is a noble gas or a halogen gas.

Still a further embodiment of the invention depicts a method of use wherein the metal within the metal fluoride is Na, Ca, K, Mg, Mn or a salt thereof.

Another embodiment of the invention shows a method of use wherein the controlled amount of fluorine gas is about 200 nanomoles to about 10 micromoles.

Still a further embodiment of the invention depicts a method of use wherein the high voltage discharge has a voltage of about 10 kV to about 50 kV.

A further embodiment shows a method of use wherein the stream of gas is a halogen gas or a noble gas.

Another embodiment of the invention shows a method of use wherein the reactor generates no heat.

Yet another embodiment depicts a use of preparing $[^{18}F]F_2$ from $[^{18}F]$ fluoride, comprising the steps of:

isolating $[^{18}F]$ fluoride from a water target by electrolysis in a reactor; then drying the $[^{18}F]$ fluoride and thereafter filling the reactor with a carrier gas or a metal fluoride to form plasma or a mixture thereof wherein the reactor also contains a controlled amount of fluorine gas; next igniting the plasma by using at least a fluorescent light tube driver circuit, a plasma induction by microwaves, or a high voltage discharge; and thereafter emptying the contents in the reactor into a stream of gas wherein $[^{18}F]F_2$ is trapped.

Still another embodiment encompasses a use of preparing $[^{18}F]F_2$ from $[^{18}F]$ fluoride according to the metal fluoride is a deposition on the wall of the reactor or a powder on the wall of the reactor or wherein the reactor comprises a reaction chamber and an optional microwave cavity and the carrier gas is a noble gas or a halogen gas and wherein the metal within the metal fluoride is Na, Ca, K, Mg, Mn or a salt thereof and optionally wherein the controlled amount of fluorine gas is about 200 nanomoles to about 10 micromoles and further wherein the high voltage discharge has an optional voltage of about 10 kV to about 50 kV and wherein the stream of gas is a halogen gas or a noble gas and finally wherein the reactor optionally generates no heat.

EXAMPLES

The invention is further described in the following examples which are in no way intended to limit the scope of the invention.

Calculations of Specific Radioactivity and Reaction Yields

The specific radioactivity ("SA") of $[^{18}F]F_2$ was determined by iodometric titration of oxidizing material and measurement of the radioactivity of the $[^{18}F]KF$ formed and indirectly by radiochromatographic determinations of amounts of mass and radioactivity of substances labeled with $^{18}F$. Note that the SA of the product in the labeling synthesis is decreased by half as compared to $[^{18}F]F_2$ as there is only a 50% chance for the introduction of the 18F-atom. The decay of the $^{18}F$ will also decrease the SA in proportion to the half-life of 109.8 minutes. When the amount of methyl fluoride used in the exchange reaction is known, the theoretical SA and yield of $[^{18}F]F_2$ can be calculated and compared to the measured time-corrected specific radioactivity of the synthesis product. From these numbers the yield in the exchange reaction can be determined.

Specific Embodiments, Citation of References

The present invention is not to be limited in scope by specific embodiments described herein. Indeed, various modifications of the inventions in addition to those described herein will become apparent to those skilled in the art from the foregoing description and accompanying figures. Such modifications are intended to fall within the scope of the appended claims.

Various publications and patent applications are cited herein, the disclosures of which are incorporated by reference in their entireties.

What is claimed is:

1. A method for preparing $[^{18}F]F_2$, comprising the steps of: isolating $[^{18}F]$ fluoride from a water target by electrolysis in a reactor; then drying the $[^{18}F]$ fluoride and thereafter filling the reactor with a carrier gas or a metal fluoride to form plasma or a mixture comprising plasma thereof wherein the reactor also contains a controlled amount of fluorine gas; next igniting the plasma with at least a plasma induction by microwaves wherein the reactor comprises a microwave cavity and optionally also igniting the plasma with a fluorescent light tube driver circuit, or a high voltage discharge; and thereafter emptying the contents in the reactor into a stream of gas wherein $[^{18}F]F_2$ is trapped.

2. The method according to claim 1, wherein the metal fluoride is a deposition on the wall of the reactor or a powder on the wall of the reactor.

3. The method according to claim 1, wherein the carrier gas is a noble gas or a halogen gas.

4. The method according to claim 1, wherein the metal within the metal fluoride is Na, Ca, K, Mg, Mn or a salt thereof.

5. The method according to claim 1, wherein the controlled amount of fluorine gas is about 200 nanomoles to about 10 micromoles.

6. The method according to claim 1, wherein the high voltage discharge has a voltage of about 10 kV to about 50 kV.

7. The method according to claim 1, wherein the stream of gas is a halogen gas or a noble gas.

8. The method according to claim 1, wherein the reactor generates no heat.

* * * * *